Serell & Cameron,
Steam Pump.
No. 1,731. Reissued July 19, 1864
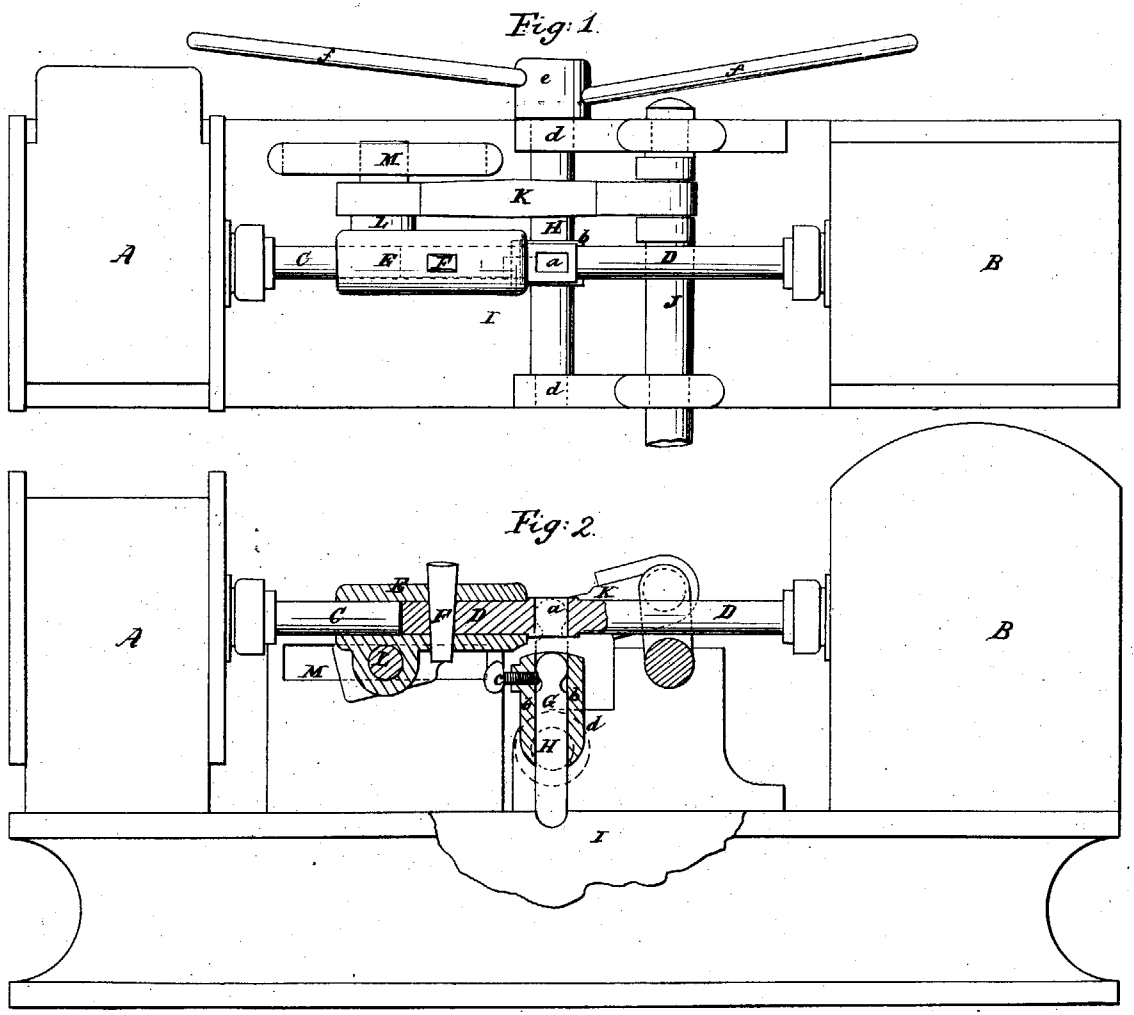
Witnesses
Geo. H. Reed
Henry T. Brown
Inventors
William Serell
Adam S. Cameron
N. PETERS, PHOTO-LITHOGRAPHER, WASHINGTON, D. C.

UNITED STATES PATENT OFFICE.

WILLIAM SEWELL AND ADAM S. CAMERON, OF NEW YORK, N. Y.

IMPROVEMENT IN DIRECT-ACTION STEAM-PUMPS.

Specification forming part of Letters Patent No. 42,694, dated May 10, 1864; Reissue No. 1,731, dated July 19, 1864.

*To all whom it may concern:*

Be it known that we, WILLIAM SEWELL and ADAM S. CAMERON, of the city, county, and State of New York, have invented a new and useful Improvement in Direct Action Steam-Pumps, by which they may be converted into two distinct machines—namely, a hand-pump and a donkey or blower engine; and we do hereby declare that the following is a full, clear, and exact description of the same, reference being had to the accompanying drawings, forming part of this specification, in which—

Figure 1 is a plan view of a steam-pump with our improvement; Fig. 2, a side view of the same with part of the connections in section.

Similar letters of reference indicate corresponding parts in both figures.

It has been heretofore necessary on steam-vessels to provide separate hand-pumps besides the steam-pumps, as there are many purposes for which a hand pump is required, as for pumping in or out of the boilers, pumping ship, washing decks, &c., in port, and in other cases when steam is down and the steam-pumps cannot be used. The ordinary hand-pumps require separate connections, which, together with the whole system of pipes, &c., of the steam-pump, make a complicated and costly arrangement. By providing for the conversion of the steam-pumps into hand-pumps the necessity for the separate hand-pumps and their several connections is obviated and their cost saved, with a very trifling addition to the cost of the steam-pumps. It has also been heretofore necessary to provide a separate steam-engine for operating the fire-blowers on steam-vessels, such engines being known as "blower-engines." It is also customary to have still another engine, known as "donkey-engine," to be used for hoisting cargo, operating cables, anchor-chains, windlasses, &c.

The object of our improvement is to provide in one mechanism a device which is capable of serving all of the above useful functions; and to this end our invention consists in providing the steam and water pistons with separate rods and with a detachable connection, and so arranging a rock-shaft having an extensible arm or its equivalent in relation to the rod of the water-piston that by means of the said rod or equivalent the said rod may be connected with the said rock-shaft, thus dividing or separating the mechanism into two distinct and independent machines, one of which is a hand water-pump and the other a steam-engine capable of use for working the fire-blowers, or as a donkey-engine for doing all kinds of general work.

Our invention also consists in making the detachable connection of the two piston-rods serve as a guide to the water-piston rod in working the pump by hand.

To enable others skilled in the art to make and use our invention, we will proceed to describe its construction and operation.

A is the cylinder, and B the water-cylinder. C is the rod of the steam-piston, and D the rod of the water-piston. E is a socket secured firmly and permanently in any suitable manner to the head of the steam-piston rod C, and having a portion of the water-piston rod D fitted into it snugly but easily, the length of the so fitted portion of the said piston-rod and the corresponding portion of the socket being a little greater than the length of stroke of the pistons, and the said portion of the said piston-rod and corresponding portion of the socket being of cylindrical form, that when the said piston-rod is disconnected the socket may serve to guide it and preserve the rectilinear motion of its piston. The rod D is secured in its socket by the key F, inserted through slots in the said rod and socket for the purpose of connecting the steam and water pistons to work the pump by steam. This key is knocked out or otherwise withdrawn to disconnect the piston-rods when the pump is to be worked by hand, or when the steam-engine is to be employed to drive the blowers, or to do donkey work. The water-piston rod D has a vertical slot, *a*, provided in it outside of the socket E, to receive the extensible arm G of the rock-shaft H.

The rock-shaft H is arranged below and transversely to the piston-rods in suitable bearings, *d d*, supported upon the bed-plate I of the pump, and is made with a socket, *b*, the parallel-sided-opening of which extends right through the rock-shaft for the reception of the extensible arm G in position. When the pump is worked by steam, the arm G is withdrawn below the upper end of the socket *b*, as shown in black outline in Fig. 2, and so secured by the set-screw, leaving the rock-shaft, disconnected from the piston-rod. One end of the rock-shaft is made with an enlarged head, *e*, in which holes are provided for the insertion of the hand levers or bars *f f*, to work the pump by hand.

When it is desired to work the pump by hand, the key F is withdrawn and the steam-piston moved back as far as possible into its cylinder, the arm G is moved upward into the slot *a* of the piston-rod D, as shown in red color in Fig. 2, and the levers or bars *f f* are inserted into the rock-shaft. The pump is then worked by one or more men at each lever or bar.

The steam-pump represented has a fly-wheel shaft connected with it in the manner claimed in William Sewell's Letters Patent of November 4, 1862, No. 36,862. J is the fly wheel shaft, and K the rod which connects the crank of the said shaft with the cross-head L, which is attached to the socket E. M is the guide for the cross-head.

The present invention is not, however, limited in its application to this kind of steam-pump, but, as is obvious, may be applied to all direct-action steam-pumps.

Having thus described our invention, we claim as new and desire to secure by Letters Patent—

1. The combination, in direct-action steam-pumps, of the separate steam and water piston rods C D, having a detachable connection, substantially as herein shown and described, so that the said rods may be disconnected and the machine used as a steam-engine or hand-pump, independent of each other, as set forth.

2. The employment of the rock-shaft H and the extensible arm G or its equivalent for connecting the said rock-shaft with the water-piston rod, substantially as and for the purpose herein specified.

3. The socket E, connecting the steam and water-piston rods for working the pumps by steam, and serving as a guide to the water-piston-rod in working the pump by hand, substantially as herein described.

WILLIAM SEWELL.
ADAM S. CAMERON.

Witnesses:
M. M. LIVINGSTON,
O. KNIGHT.